(12) United States Patent
Veneroso et al.

(10) Patent No.: US 9,239,588 B2
(45) Date of Patent: Jan. 19, 2016

(54) METHOD AND SYSTEM FOR CALCULATING A CLOCK FREQUENCY OF A CLOCK SIGNAL FOR AN IC CARD

(75) Inventors: Amedeo Veneroso, Caserta (IT); Vitantonio Distasio, Caserta (IT); Francesco Varone, Bellona (IT)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 367 days.

(21) Appl. No.: 13/977,114

(22) PCT Filed: Dec. 23, 2011

(86) PCT No.: PCT/EP2011/006553
§ 371 (c)(1),
(2), (4) Date: Aug. 29, 2013

(87) PCT Pub. No.: WO2012/089332
PCT Pub. Date: Jul. 5, 2012

(65) Prior Publication Data
US 2013/0332766 A1    Dec. 12, 2013

(30) Foreign Application Priority Data

Dec. 30, 2010   (IT) .............................. MI2010A2474

(51) Int. Cl.
*G06F 1/06*   (2006.01)
*G06F 1/08*   (2006.01)
*G06K 19/07*  (2006.01)

(52) U.S. Cl.
CPC .. *G06F 1/06* (2013.01); *G06F 1/08* (2013.01); *G06K 19/07* (2013.01)

(58) Field of Classification Search
CPC ......................................................... G06F 1/08
USPC ......................................................... 713/501
See application file for complete search history.

(56) References Cited

U.S. PATENT DOCUMENTS

| 5,070,233 | A  | * | 12/1991 | Takizawa et al. | ............. | 235/380 |
| 5,146,068 | A  | * | 9/1992  | Ugawa et al.    | ................. | 235/441 |
| 6,744,697 | B2 | * | 6/2004  | Mitra et al.    | ..................... | 368/46  |
| 6,808,113 | B2 | * | 10/2004 | Yamasaki        | ..................... | 235/451 |
| 7,411,970 | B2 | * | 8/2008  | Scott et al.    | ..................... | 370/419 |
| 7,778,277 | B2 | * | 8/2010  | Yang            | ............................. | 370/474 |
| 8,355,476 | B2 | * | 1/2013  | Lee et al.      | ....................... | 375/354 |
| 2001/0022823 | A1 | * | 9/2001 | Renaud          | ........................ | 375/359 |

FOREIGN PATENT DOCUMENTS

FR              2844897           3/2004

* cited by examiner

*Primary Examiner* — Suresh Suryawanshi
(74) *Attorney, Agent, or Firm* — Allen, Dyer, Doppelt, Milbrath & Gilchrist, P.A.

(57) ABSTRACT

A clock frequency of a clock signal is calculated, with the clock signal being received by an IC card from a terminal or an internal clock within the IC card. A first time-stamp is received from the terminal, and a first value of the timer is set. The timer of the IC card is started when the first time-stamp is received. A second time-stamp is received, and a second value of the timer is read when the second time-stamp is received. The frequency is calculated by comparing a difference between the second and the first timer values, and a difference between the second and the first time stamps.

27 Claims, 5 Drawing Sheets

(PRIOR ART)

Figure 3

(PRIOR ART)

METHOD AND SYSTEM FOR CALCULATING A CLOCK FREQUENCY OF A CLOCK SIGNAL FOR AN IC CARD

FIELD OF THE INVENTION

The present invention relates to a method and system for calculating a clock frequency of a clock signal inside an IC card. The clock signal may be received from a terminal, such as a handset or a mobile phone, or may be provided by a clock within the IC card. More particularly, the present invention relates to the calculated frequency being used to measure time inside the IC card.

BACKGROUND OF THE INVENTION

An IC card receives electrical power and clock signals from a terminal. Thus, if the terminal is turned off or not connected to the IC card, a clock signal is not received. Moreover, even when the IC card is connected to the terminal and powered on, the clock signal is not continuously provided. Moreover, even when the IC card is connected to the terminal and powered on, it does not know the clock frequency of the terminal.

On the other hand, the clock frequency may not be a priori known to the IC card, since it may be connected to several terminals, providing different clock frequencies. Thus, since the IC card does not know the clock frequency, it cannot measure time. Even the most advanced IC cards include only two hardware timers, i.e., an incremental timer and a decrement timer. The decrement timer is loaded with a predetermined value and is decreased at every clock cycle. It may be configured to decrease a pre-scale value at each clock cycle.

Figure 1:
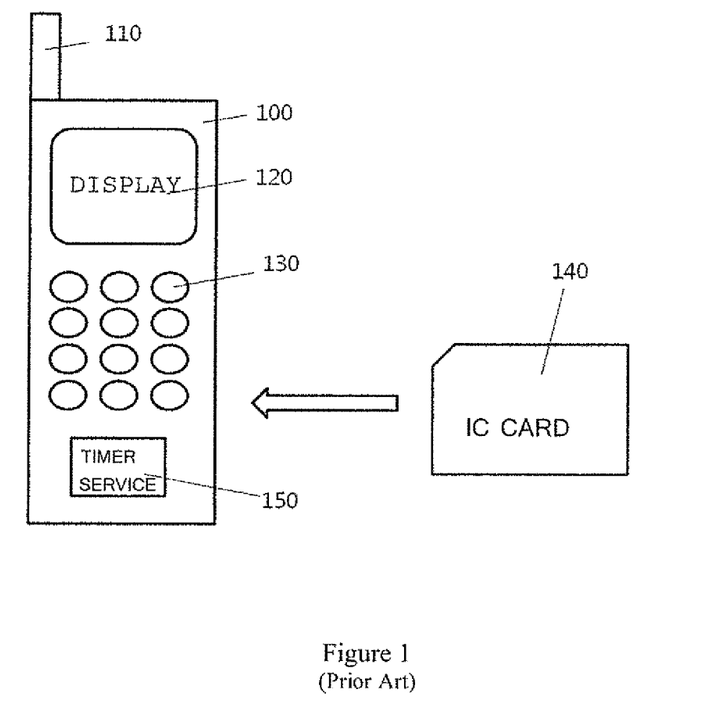
FIG. 1 schematically represents an IC card and a terminal providing a clock frequency to the IC card according to the prior art.

FIG. 1 schematically represents an IC card 140 and a terminal wherein the IC card is inserted. The terminal 100 comprises a radio interface, such as an antenna 110, a display 120, and buttons 130. The terminal provides a timer service 150 to the IC card 140.

Figure 2:
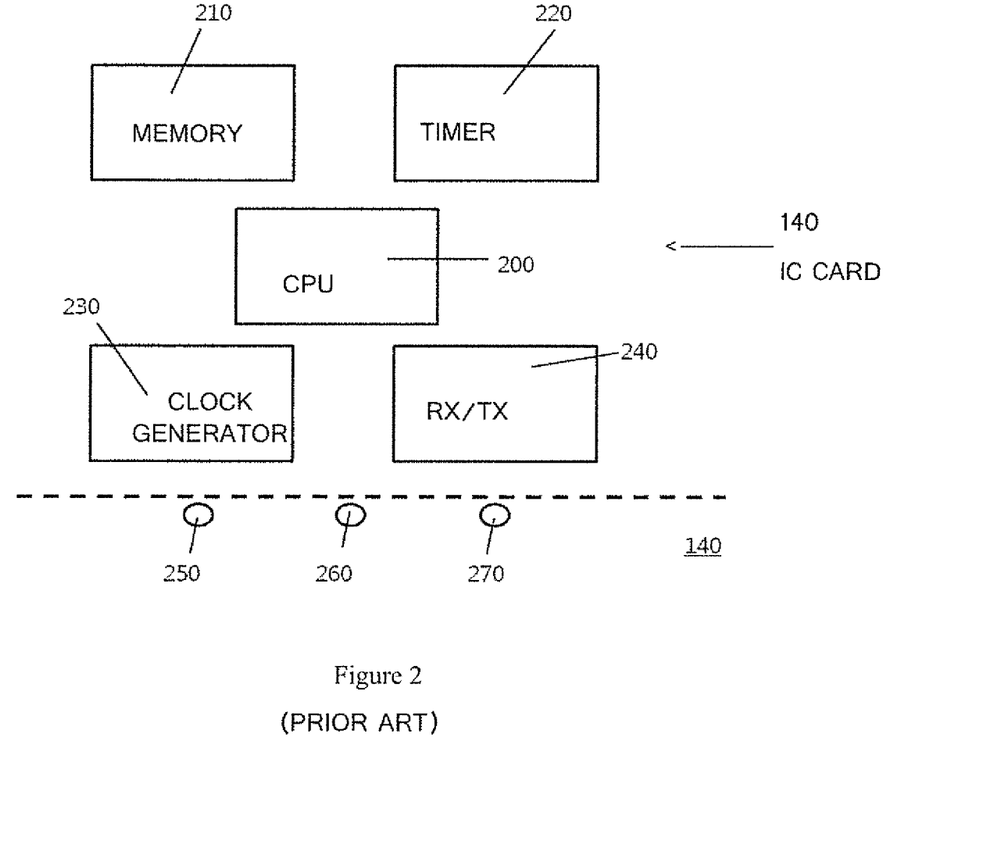
FIG. 2 represents the internal hardware structure of the IC card of FIG. 1.

FIG. 2 represents the internal hardware structure of the IC card. More particularly, the IC card 140 comprises a central processor unit (CPU) 200, a memory 210, a timer 220, an optional internal clock generator 230, and a universal asynchronous receiver/transmitter 240. The IC card 140 further includes interfaces for the terminal, i.e., an external clock interface 250, a data 260 interface and a power interface 270. The interface for data 260 is used for communicating data with the terminal 100 while the interface for power 270 is used for receiving electrical power from the external device 100.

In case the IC card 140 includes an internal clock 230, an application stored in the IC card or the IC card operating system may manage the use of the internal clock 230 independently on the external clock 250 of the terminal or the external clock 250 of the terminal. The internal clock 230 may be emitted by internal hardware of the card, such as an oscillator or a PLL. The external clock is generated outside the IC card 140, e.g, by the terminal 100 through the corresponding interface 250. The frequency of the clock internally generated by the IC card may not be a priori known to the IC card as well, since it may depend on several electrical parameters strictly related to the IC production process, and so may be different for each IC card. This is because of the production tolerances and operating conditions providing different clock frequencies among a well-defined clock frequency interval.

In other words, the problem affecting the known IC card 140 is that it cannot detect the frequency of the clock at runtime. Moreover, different types of clocks can be supplied to the IC card 140 depending on what clock is used at a specific time, i.e., the internal clock or an external clock. For the internal clock frequency, if an internal clock is available, it could be known from the IC card specification. However, due to the fluctuation of the power level and other operating conditions, such as temperature or due to several electrical parameters strictly related to the IC production process and production tolerances, the actual internal clock frequency can be different from the nominal frequency value of the specification, and may be different for each IC card.

Figure 3:
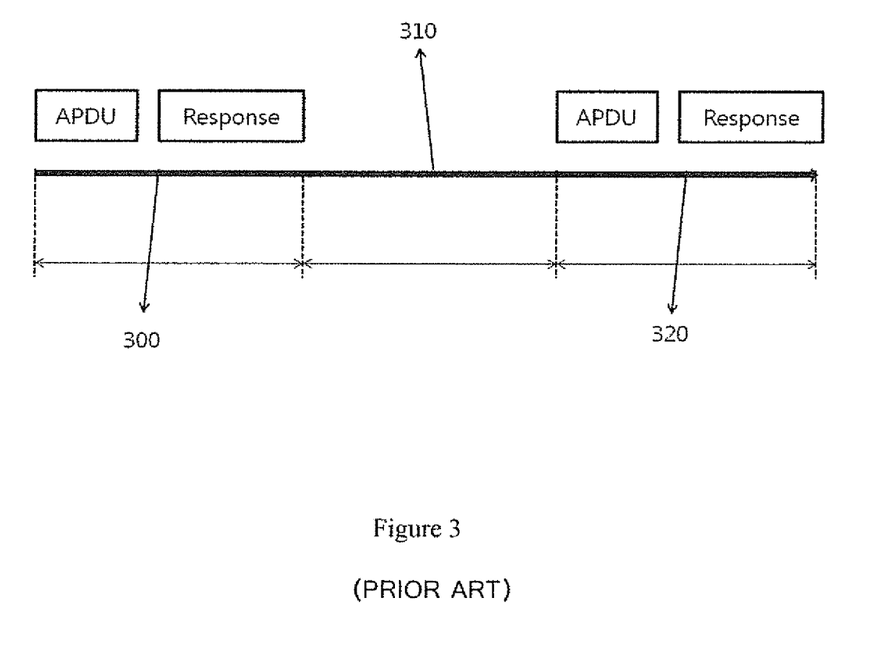
FIG. 3 represents a timeline during switch on-off of the IC card of FIG. 2.

Additionally, as depicted in FIG. 3, it may be usual for a terminal to switch off the clock supply when no communication takes place to reduce the IC card current absorption. During the interval 300, 320, the IC card 140 is switched on and can communicate APDU messages with the external device 100. During these time intervals, the timer 220 can be active. However, during the interval 310 when the IC card 140 is still switched on but the external clock is not generated by the terminal 100 for power savings, it is still possible to increase or decrease the timer value.

SUMMARY OF THE INVENTION

The technical problem is to calculate the clock frequency of a clock signal, and to precisely measure time inside an IC card, not only when the IC card is provided with an internal hardware clock, but also when the IC card is not provided with an internal clock but instead receives a signal of unknown frequency from a terminal. This addresses the limitations and drawbacks that currently affects the known IC cards.

One approach is to transmit at least two time stamps from the terminal to the IC card, to read values of a timer of the IC card when the time stamps are received, and to calculate the clock frequency of a clock signal transmitted by the terminal to the IC card based on a comparison between a time difference of time stamps and a value difference of the timer.

The timer may be increased or decreased at each clock cycle, independently on which clock signal is used by the IC card. Thus, the number of times the timer has been increased or decreased in the time elapsed between the two time stamps may be used for calculating the clock frequency provided by the terminal. Advantageously, once the clock frequency of the terminal is known inside the IC card, the card may measure time on the base of the clock signals it receives from the terminal and apply the measure of time to several applications, such as for improving IC card security. This approach is applicable to precisely calculate the clock frequency of a clock signal provided by an internal clock of the IC card.

The above mentioned technical problem may be addressed by a method for calculating a clock frequency fclk of a clock signal received by an IC card from a terminal or an internal clock frequency fclk of a clock signal provided by the IC card. The method may comprise receiving a first time-stamp from the terminal, and setting a first value of a timer of the IC card and starting the timer of the IC card when the first time-stamp is received, and receiving a second time-stamp. The method may further comprise reading a second value of the timer when the second time-stamp is received, and calculating the clock frequency comparing a difference between the second and the first timer values and a difference between the second and the first time stamps.

The steps of comparing may comprise dividing the difference between the second and the first time stamps with difference between the second and the first timer values.

A difference between the second and first timer values may be adjusted considering a number of clock cycles that have occurred between receipt of the first time-stamp and the effective start time of the timer. Preferably, also a number of clock cycles that occurred between receipt of the second time-stamp and the effective time in which the second value of the timer is read is used to adjust such a difference between the second and first timer values.

The number of clock cycles occurred between receipt of the first time-stamp and the effective start time of the timer or the reading of the timer may be processed only once and it is substantially considered a constant value. The constant value may be evaluated on the basis of the hardware performance and/or CPU programming model of the IC card. This constant value may be associated with the delay to be considered for starting or reading the timer.

The effective start time may be associated to nclk1/fclk and the effective time in which the second value is read may be associated to nclk2/fclk, wherein nclk1 is a number of clock cycles occurring between receipt of the first time-stamp and the start of the timer, and nclk2 is a number of clock cycles occurring between receipt of the second time-stamp and the reading of the second value of the timer. More particularly, the effective start time may be calculated by adding nclk1/fclk to the first time-stamp, and the effective time in which the second value is read may be calculated by adding nclk2/fclk to the second time-stamp ts2.

The method may provide the steps of obtaining a first processing time which is associated to the clock cycles occurring between receipt of the first time stamp and a setting of the first value of the timer. The step of obtaining a second processing time may be associated to the clock cycles occurring between receipt of the second time stamp and the reading of the second value of the timer. The step of calculating the clock frequency may be adjusted including the first processing time and the second processing time.

Since there is a delay between the time when the first time stamp is received and when the timer is started, by reflecting the delay in the calculation of the frequency of the timer, the frequency can be measured more exactly. Furthermore, since there is a delay between the time when the second command is received and a second value of the timer is read, this delay is also considered to calculate more exactly the frequency.

The first processing time and/or the second processing time may be computed at run time inside the IC card. The first processing time and/or the second processing time may be set by a parameter of pre-personalization.

The first processing time and/or the second processing time may be computed at run time only once, after the connection of the IC card with the terminal. It may be used as a constant value approximating each operation involving the start of the timer or the reading of the timer for calculating the clock frequency.

The first processing time and/or the second processing time may be computed at compile time. If an application is compiled, the assembly code for the application is generated. Since an execution time for each of the assembly code can be estimated, total amount of time can be estimated approximately by summing each execution time. By using a preset first and/or second processing time, the calculation of the frequency can be simplified.

In a preferred embodiment, the steps of receiving the first time-stamp, starting the timer, reading the first value of the timer, receiving the second time-stamp, reading the second value of the timer, and calculating the frequency may be repeated several times to measure the clock frequency. The clock frequency may then be obtained by averaging the frequency of the clock measured several times. Averaging the measure improves the precision of the clock frequency, and allows implementing strong protection based on the time measure. In other words, this embodiment has an advantageous effect because the reliability of measurement improves and it can provide an estimation of the clock frequency variance.

Preferably, the first time-stamp and the second time-stamp may be encrypted before transmission to the IC card. This avoids a hacking terminal from implementing the method, and forcing the IC card to process a wrong clock frequency and thus wrong time measurements.

The clock frequency may be processed with the following formula:

$$f_{clk} = \frac{V_2 - V_1 + n_{clk1} - n_{clk2}}{t_{s2} - t_{s1}}$$

Wherein ts1 is the first time-stamp, ts2 is the second time-stamp, V2 is the second value of the timer, V1 is the first value of the timer, nclk1 is the number of clock cycles occurring between receipt of the first time-stamp and the effective start of the timer, and nclk2 is the number of clock cycles occurring between receipt of the second time-stamp and the effective reading of the second value of the timer.

Advantageously, using two different time stamps, the IC card measures the frequency of the clock of the terminal even though the frequency is not a priori known or it varies due to the specific working conditions, such as for the temperature.

In another aspect, the method further comprises obtaining a first absolute time from the terminal, counting the number of clock cycles elapsed, and updating a current absolute time value based on the frequency of the timer, the first absolute time value, and the number of clock cycles.

Further advantages and features of the method and the IC card according to the present invention will be apparent from the description given here below only for illustrative purposes, and without limiting the scope of protection.

DETAILED DESCRIPTION OF THE PREFERRED EMBODIMENTS

Figure 4:
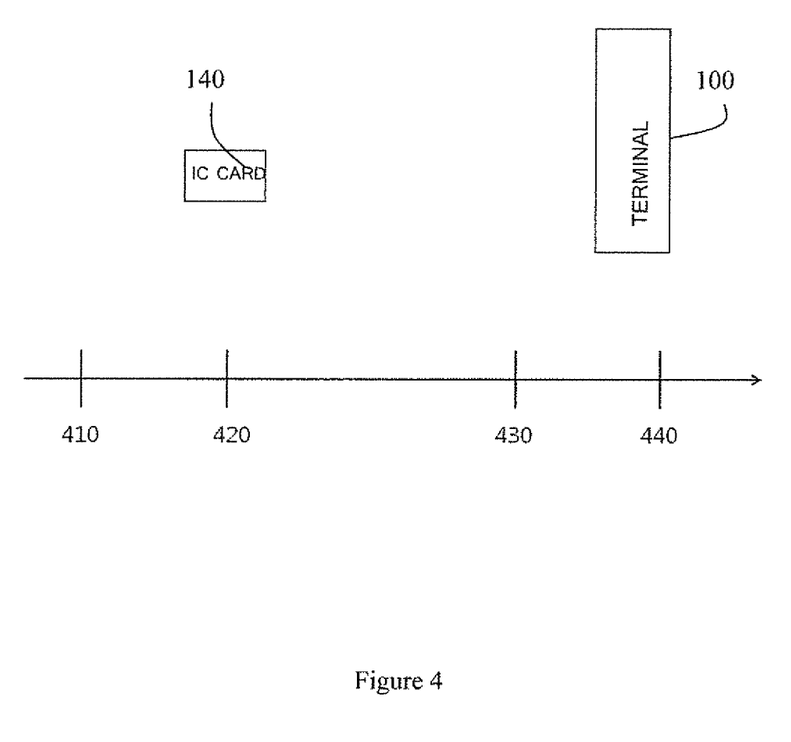
FIG. 4 schematically represents a timeline including the relevant steps for calculating the clock frequency according to the present invention.

With reference to FIG. 4, the method for calculating a clock frequency fclk of a clock signal received by an IC card 140 from a terminal 100 is schematically represented. The IC card 140 requests to the terminal 100 to receive two commands comprising the time-stamp, i.e, a first time stamp ts1 and second time stamp ts2. A first command including the first time stamp information ts1 is requested before the second command, including the second time stamp information ts2. The request can be made by the IC card 140 to the external device or terminal 100. Alternatively, an external device 100, which knows the status of the IC card 140, may directly send the above commands without a request from the IC card 140.

At the reception of the first command, the IC card 140 starts the internal timer 220. The IC card 140 knows at compile time how many clock cycles nclk1 occur between the time when the first command is received and the time when the timer effectively starts. Clock cycle nclk1 is also referred to as first processing time. In other words, the timer starts at T1, which is ts1+te1, where te1=nclk1/fclk. The first value of the timer at time T1 is V1.

At the reception of the second command, the IC card 140 reads the second value of the timer, which is V2. The IC card 140 knows at compile time how many clock cycles nclk2 occur between the time when the second command is received and the time when the timer value V2 is read. The nclk2 may be referred to as a second processing time. The second value of the timer is read at T2, which is equal to ts2+te2, where te2=nclk2/fclk.

With reference to FIG. 4, the relation among ts1, T1, ts2, and T2 is hereafter explained. At time ts1 410, the first command is received by the IC card 140. At reception of the first command, the IC card 140 issues an instruction to start the timer 220. Since there exists some delay for the timer to be started, the timer 220 really starts at time T1 420, when the value of the timer is V1. Similarly, at time ts2 430, the second command is received by the IC card 140. On receipt of the second command, the IC card 140 issues an instruction to read the value of the timer 220. Since there exists some delay for the value to be read, at time T2 440, the value of the timer is read, which is V2.

Preferably, the IC card 140 calculates the internal clock frequency as:

$$f_{clk} = \frac{V_2 - V_1 + n_{clk1} - n_{clk2}}{t_{s2} - t_{s1}}$$

The formula is explained below.

As mentioned above, the time when the timer starts T1 and the time when the value of the timer is read T2 are defined as:

$$T_1 = t_{s1} + \frac{n_{clk1}}{f_{clk}}$$

$$T_2 = t_{s2} + \frac{n_{clk2}}{f_{clk}}$$

By the definition of T1, T2, V1, V2 and fclk the following equation is derived:

$$T_2 - T_1 = \frac{V_2 - V_1}{f_{clk}}$$

wherein fclk is the frequency of the clock to be calculated. From the above formulas, the following is derived:

$$t_{s2} - t_{s1} + \frac{n_{clk2} - n_{clk1}}{f_{clk}} = \frac{V_2 - V_1}{f_{clk}}$$

and thus the clock frequency:

$$f_{clk} = \frac{V_2 - V_1 + n_{clk1} - n_{clk2}}{t_{s2} - t_{s1}}$$

It is assumed that V1, V2, nclk1, nclk2 have the same time scale. If the scale is different, changes have to be made to the formula.

Since there exists a delay between the time when the first command is received and when the timer is started, by reflecting the delay in calculating the frequency of the timer, the frequency is measured more exactly.

Advantageously, knowing the internal clock frequency, one absolute time value and the elapsed number of clock cycles, it is possible in any moment to know and update the absolute time value on request and make it available to the application layer. Alternatively, the IC card 140 can simply act when a certain time interval is elapsed.

Instead of computing the value nclk1, nclk2 at compile time, these values can be achieved by a proper measurement or a parameter to be set at pre-personalization.

Figure 5:
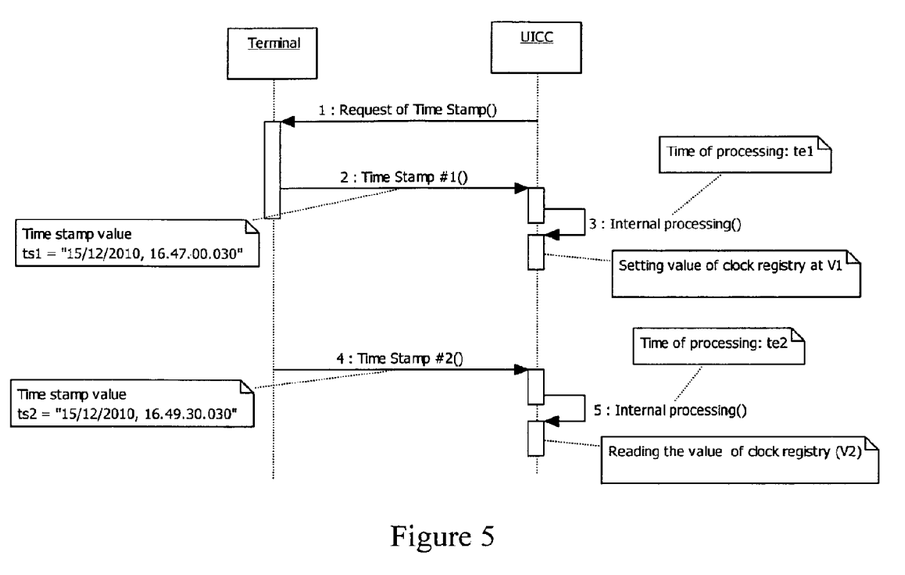
FIG. 5 represents in a block diagram the method for calculating the clock frequency according to the present invention.

FIG. 5 schematically represents an execution of the method. The first time stamp ts1 is "15/12/2010, 16.47.00.030"; the second time stamp ts2 is "15/12/2010, 16.49.30.030"; the number of clocks nclk1, which is computed by the compiler off-line, is 7000; the number of clocks nclk2 is 6000 (in this case computed by the compiler off-line); the first timer value V1 is 100,000,000,000 and corresponds to the value of the timer register which is set at start, for example, with an IC card having a decreasing counter; V2 is 97,000,000,500 and corresponds to the value of the timer register when the second time stamp is received. According to the above values the clock frequency calculated according to the formula $$f_{clk} = \frac{V_2 - V_1 + n_{clk1} - n_{clk2}}{t_{s2} - t_{s1}}$$

is fclk=19,999,996 Hz.

Once synchronization is complete, the card is aware of the exact clock frequency and it can take advantage of the synchronization to supply new services.

Example service usage includes a policy that specifies that every Phone Call can be at most 1 minute long. With the above computed frequency clock, 1 minute is exactly:

nclk_1 min=19,999,996*60=1,199,999,760 clock cycles

The above service of a "one minute call" can then be realized as follows: when the UICC receives the "CALL CONTROL" envelope, indicating the call is initiating, the register counter is set to 1,199,999,760; and when the timer register reaches the 0 value, an interrupt will be issued to inform that the minute is over and the UICC requests the handset call termination.

The following advantages can be achieved. First, it is possible to estimate processing performance. Knowing the clock frequency, the IC card OS can estimate how fast it can make certain tasks. In an IC card environment, particularly in telecommunications, some operations have strict time constraints, for example, to guarantee the smoothness of sound during a call. The IC card OS may determine that, based on the detected clock frequency, such operations cannot be completed on time and thus react accordingly. Such as, for example, refusing the call or switching to an optimized/degraded algorithm able to give some results in less clock cycles.

Moreover, it is possible to control the power consumption. In fact, if the external clock frequency is too high, the IC card current absorption could rise and get over the standard threshold, or simply cause the reduction of battery autonomy. In this case, the card OS could switch off secondary hardware modules to compensate consumption and switched on again when needed. The higher speed could guarantee that the overall performance is preserved, even if hardware is periodically disabled and enabled. When the clock frequency is not high, all hardware modules always stay on, with no time wasted in managing them.

Furthermore, the time stamp can be supplied by the terminal with a specific APDU command, as well as derived from ordinary IC card-to-terminal communication, to avoid trusting terminal, e.g., the received SMS, that implicitly contains a time stamp. To guarantee the time stamp to be current, the operator could arrange a "time signal" based on dedicated SMS or cell broadcast messages.

According to another aspect, more accurate time counting is possible by using several measurements. Using merely two measurements could incur in an imprecise time counting. In other words, especially when the time to create a message on the external device 100 and/or the time to transmit the message to the IC card 140 is variable, a single measurement is not reliable.

In this case, several calculations of the clock frequency are executed and an averaging technique is applied to improve the reliability of the average clock frequency, and provide an estimation of the clock frequency variance. Regarding the clock frequency variance, if the variance is considered to be too high, the IC card can assume that the time awareness is not reliable in that specific terminal.

Moreover, the method overcomes the problem of internal clocks with a variance. In fact, in an IC card secured chip, the clock usually has a variance to provide unpredictability in terms of execution time.

In another aspect, secure clock frequency calculation and time measuring are implemented. The time awareness is used to improve security. For example, it is required that the IC card 140 has to wait a certain time before processing a secured command if the previous one was unsuccessful. In this case, a malicious external device 100 can send an incorrect time stamping to avoid the waiting time, which makes the IC card 140 have completely wrong assumptions on time stamping.

To overcome this, a secure time measuring system can be introduced. This is simply done by providing a ciphered (or encrypted) version of the time stamp to the IC card 100 from a trusted source. For example, the trusted source can be, in telecom environments, a remote device sending Secured Data, e.g., an enciphered SMS. Alternatively, a trusted terminal sends data ciphered by using a key that is shared with the IC card 140.

Thus, the IC card 140 is able to authenticate a remote time stamp authority and can rely on time stamp information.

Advantageously, parental control may be provided as an application on the IC card 140. For example, for the IC card OS to be able to measure time, it can be programmed to limit conversation time. This could be used to limit the time spent talking by a child. Therefore, it is possible to reduce money spent in a phone call. Limiting the time for a call is also useful for limiting and making radio wave radiation exposure less continuous.

The invention claimed is:

1. A method for calculating a clock frequency of a clock signal received by an IC card, and comprising:
receiving a first time-stamp from a terminal;
setting a first timer value of a timer of the IC card and starting the timer when the first time-stamp is received;
receiving a second time-stamp from the terminal;
reading a second timer value of the timer when the second time-stamp is received; and
calculating the clock frequency based on comparing a difference between the second and first timer values, and a difference between the second and first time-stamps.

2. The method according to claim 1, wherein the clock signal is generated by the terminal.

3. The method according to claim 1, wherein the clock signal is generated by a clock generator within the IC card.

4. The method according to claim 1, wherein the comparing comprises dividing the difference between the second and first timer values with the difference between the second and first time-stamps.

5. The method according to claim 4, further comprising adjusting the difference between the second and first timer values based on a number of clock cycles occurring between receipt of the first time-stamp and an effective start time of the timer, and a number of clock cycles occurring between receipt of the second time-stamp and the effective time in which the second timer value of the timer is read.

6. The method according to claim 5, wherein the effective start time is calculated by adding a first value nclk1/fclk to the first time-stamp, and the effective time in which the second timer value is read is calculated by adding a second value nclk2/fclk to the second time-stamp, wherein nclk1 is a number of clock cycles occurring between receipt of the first time-stamp and the effective start of the timer and nclk2 is a number of clock cycles occurring between receipt of the second time-stamp and the effective reading of the second timer value.

7. The method according to claim 6, wherein the frequency is processed based on the following formula:

$$f_{clk} = \frac{V_2 - V_1 + n_{clk1} - n_{clk2}}{t_{s2} - t_{s1}}$$

where $f_{clk}$ is the clock frequency, $V_1$ is the first timer value, $V_2$ is the second timer value, $t_{s2}$ is the second time-stamp, and $t_{s1}$ is the first time-stamp.

8. The method according to claim 1, further comprising:
obtaining a first processing time associated to the clock cycles occurring between receipt of the first time stamp and reading of the first timer value of the timer; and
obtaining a second processing time associated to the clock cycles occurring between receipt of the second time stamp and reading of the second timer value;
wherein calculating the clock frequency includes the first processing time and the second processing time.

9. The method according to claim 8, wherein at least one of the first and second processing times is computed at runtime.

10. The method according to claim 8, wherein at least one of the first and second processing times is set by a pre-personalization parameter.

11. The method according to claim 1, further comprising:
repeating the receiving, the setting, the starting, the receiving, and the reading for calculating multiple clock frequencies; and
averaging the multiple clock frequencies to obtain an average clock frequency.

12. The method according to claim 1, wherein the first and second time-stamps are encrypted.

13. An IC card comprising:
a timer configured to receive first and second time-stamps from a terminal; and
a processor coupled to said timer and configured to
start said timer when the first time-stamp is received,
set a first timer value of said timer and starting said timer when the first time-stamp is received,
read a second timer value of said timer indicating when the second time-stamp is received, and
calculate a clock frequency of a clock signal based on comparing a difference between the second and first timer values, and a difference between the second and first time-stamps.

14. The IC card according to claim 13, wherein the clock signal is generated by the terminal.

15. The IC card according to claim 13, further comprising a clock generator configured to generate the clock signal.

16. The IC card according to claim 13, wherein said processor is further configured to:
obtain a first processing time associated to clock cycles occurring between receipt of the first time stamp and reading of the first timer value; and
obtain a second processing time associated to the clock cycles occurring between receipt of the second time stamp and reading of the second timer value;
wherein calculating the clock frequency includes the first processing time and the second processing time.

17. The IC card according to claim 16, wherein said processor is configured to obtain the first processing time and the second processing time at runtime.

18. The IC card according to claim 13, wherein said processor is further configured to divide the difference between the second and first timer values and the difference between the second and first time-stamps.

19. The IC card according to claim 18, wherein said processor is further configured to adjust the difference between the second and first timer values based on a number of clock cycles occurring between receipt of the first time-stamp and an effective start time of said timer, and a number of clock cycles occurring between receipt of the second time-stamp and the effective time in which the second timer value of said timer is read.

20. An apparatus comprising:
a terminal;
an IC card received by said terminal and comprising
a timer configured to receive first and second time-stamps from said terminal, and
a processor coupled to said timer and configured to
set a first timer value of said timer and start said timer when the first time-stamp is received,
read a second timer value of said timer indicating when the second time-stamp is received, and
calculate a clock frequency of a clock signal based on comparing a difference between the second and first timer values, and a difference between the second and first time-stamps.

21. The apparatus according to claim 20, wherein said terminal comprises a timer service module configured to generate the clock signal.

22. The apparatus according to claim 20, wherein said IC card comprises a clock generator configured to generate the clock signal.

23. The apparatus according to claim 20, wherein said processor is further configured to:
obtain a first processing time associated to clock cycles occurring between receipt of the first time stamp and reading of the first timer value; and
obtain a second processing time associated to the clock cycles occurring between receipt of the second time stamp and reading of the second timer value;
wherein calculating the clock frequency includes the first processing time and the second processing time.

24. The apparatus according to claim 23, wherein said processor is configured to obtain the first processing time and the second processing time at runtime.

25. The apparatus according to claim 20, wherein said processor is further configured to divide the difference between the second and first timer values and the difference between the second and first time-stamps.

26. The apparatus according to claim 25, wherein said processor is further configured to adjust the difference between the second and first timer values based on a number of clock cycles occurring between receipt of the first time-stamp and an effective start time of said timer, and a number of clock cycles occurring between receipt of the second time-stamp and the effective time in which the second timer value of said timer is read.

27. The apparatus according to claim 20, wherein said terminal comprises an antenna and a radio interface coupled.

\* \* \* \* \*